| United States Patent [19] | [11] | Patent Number: | 4,563,404 |
|---|---|---|---|
| Bahary | [45] | Date of Patent: | Jan. 7, 1986 |

[54] CELL GELLING AGENT

[75] Inventor: William S. Bahary, Pearl River, N.Y.

[73] Assignee: Duracell Inc., Bethel, Conn.

[21] Appl. No.: 621,831

[22] Filed: Jun. 18, 1984

[51] Int. Cl.$^4$ .................. H01M 4/26; H01M 4/62
[52] U.S. Cl. .................... 429/206; 29/623.4;
252/182.1; 252/315.01; 429/217; 429/229
[58] Field of Search ............ 429/190, 134, 206, 217,
429/229, 212; 29/623.4; 252/315.01, 315.1,
182.1

[56] References Cited

U.S. PATENT DOCUMENTS

| 3,842,013 | 10/1974 | Booth | 252/315.01 |
|---|---|---|---|
| 3,884,721 | 5/1975 | Tucholski | 429/212 |
| 4,288,913 | 9/1981 | Parsen et al. | 429/190 |
| 4,332,870 | 6/1982 | Parsen et al. | 429/206 |
| 4,435,488 | 3/1984 | Bahary et al. | 429/212 |
| 4,455,358 | 6/1984 | Graham et al. | 429/190 |

*Primary Examiner*—Donald L. Walton
*Attorney, Agent, or Firm*—Ronald S. Cornell; Israel Nissenbaum

[57] ABSTRACT

A cell having an anode comprised of an anode metal gelled with a hydrolyzed polyacrylonitrile gelling agent.

19 Claims, No Drawings

CELL GELLING AGENT

This invention relates to gelled anodes for electrochemical cells and particularly to alkaline cells having zinc anodes.

In order to maintain homogeneity within the anode of alkaline cells whereby anodic materials such as amalgamated zinc powders are kept uniformly dispersed for maximum electrochemical activity, such anodes are kept in a gelled state. Common gelling materials utilized in commercial cells include carboxymethylcellulose (CMC), starch graft copolymers such as Waterlock A-221 from Grain Processing Corporation, and polyacrylic acid such as Carbopol from B. F. Goodrich Co. Other gelling materials include cross-linked polyacrylamides such as described in U.S. Pat. No. 3,884,721, and cross linked CMC as described in U.S. Pat. No. 4,435,488.

The efficacy of the gelling materials in electrochemical cells such as alkaline cells is determined by studies of cell performance factors, gassing, long term storage, ease of handling during manufacturing and of course compatability with the cell components. The aforementioned prior art gelling materials having exhibited varying degrees of utility with respect to the enumerated criteria. Thus, for example, while both the starch graft copolymers and the polyacrylic acid provide improved characteristics relative to the previously used CMC, improvements remain to be made in extending the storage like of anodes made with the starch graft copolymer and the handling of anodes made with the polyacrylic acid.

It is an object of the present invention to provide a novel gelling agent for use in making gelled anodes with improved storage life, stability and handling. This and other objectives, features and advantages of the present invention will become more evident from the following discussion.

Generally, the present invention comprises a method of making gelled anodes for alkaline cells with the use of hydrolyzed polyacrylonitrile (particularly alkali hydrolyzed) as a gelling agent, the anodes so formed and the cells containing such anodes.

Polyacrylonitrile having the repeating units:

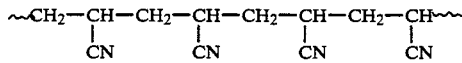

when hydrolyzed with alkali materials at elevated temperatures such as with treatment of concentrated KOH at 80° C. forms a polymeric structure:

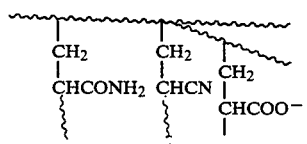

with acrylate, amide, and nitrile groups with some degree of cross linking as shown. The hydrolyzed polyacrylonitrile is comprised of various short and long chain branches with various degrees of cross linking and solubilities generally related to the hydrolysis parameters. An example of a commercially available alkali hydrolyzed polyacrylonitrile is Waterlock A-400 from Grain Processing Corporation.

Materials such as the aforementioned Waterlock A-221 are comprised of starch backbones having polyacrylonitrile grafted thereto which grafted materials are thereafter hydrolyzed. Such materials have been considered to be highly absorbent with high gel strengths. It has however been discovered that elimination of the starch backbone and the use of the hydrolyzed polyacrylonitrile without such starch backbone in electrochemical cells provides an unexpected advantage of improved performance after periods of storage.

The gelled anodes of the present invention are made in accordance with the prior art practice of either pregelling the anode in the form of a slurry and thereafter dispensing the gel into the cells or forming the gel in situ. In the former instance, the hydrolyzed polyacrylonitrile is admixed with an active anode material such as powdered zinc and a controlled amount of the cell electrolyte which is generally an alkaline 30–40% KOH aqueous solution. In the in situ processing, the anodic material and the hydrolyzed polyacrylonitrile are mixed and dispensed into the cell container in the dry state and then activated into a gel by the presence of the cell electrolyte. Lubricants and additives such as glycerine, polyhydric alcohols, mineral oil and the like to facilitate handling and processing, may be additionally added to the anode mixture.

The amount of hydrolyzed polyacrylonitrile utilized in the gelled anode may range from 0.6 to 1.5% with a preferred range of 0.8 to 1.2% and a preferred amount of about 0.9%. This compares favorably with other gelling agents which require substantially greater amounts of gelling agents usually in the area of about 2–3% by weight.

The hydrolyzed polyacrylonitrile may be utilized either alone as the sole gelling agent or in admixture with other gelling agents such as starch graft copolymers, CMC or polyacrylic acid with varying degrees of effectiveness.

In the present invention, the anode is a gelled mixture of the electrolyte solution and a metal in a particulate or porous form. The metal useful in the anode of the present invention can be any metal generally used in cells having an aqueous electrolyte. Such metals can include aluminum, cadmium, calcium, copper, indium, iron, lead, magnesium, manganese, mercury, nickel, tin, zinc and other metals well known in the art, used either alone or in alloys, amalgamations and admixtures. The anode metal can be used in the cell as a powder, as granules or in any other particulate form.

In the preferred cell, the anode metal comprises powdered amalgamated zinc. Powdered metals provide the largest exposure of anode surface area to the electrolyte. Further, the finer the anode metal powder, the greater the ability of the gel to retain the particles uniformly throughout the gel, which acts to maintain the exposure of the anode metal to the electrolyte. The particle size of the preferred anode metal powder is of the order of from 0.03 to 0.9 millimeter in diameter. The most preferred size of powder to be used depends on many factors and it can be readily determined by one skilled in the art.

The electrolyte solutions which can be gelled by the agents of the present invention, include all aqueous electrolyte solutions usable in electrochemical cells. In the preferred embodiment of the present invention alkaline electrolyte solutions are employed. These include, but are not limited to, hydroxides of alkali and alkaline earth metals. Sodium and/or potassium hydroxide are the most commonly used alkaline electrolytes.

The hydrolyzed polyacrylonitrile gelling agent of the present invention can be used with all cathodes heretofore useful in aqueous electrochemical cells. These cathodes include, but are not limited to metal oxides, such as cadmium oxide and hydroxide, mercuric oxide, lead oxide, manganese dioxide, nickel oxide and hydroxide, silver oxide and air.

In order to more fully illustrate the efficacy of the present invention the following comparative examples are presented. It is understood, however, that such examples are illustrative in nature and any enumeration of detail therein should not be construed as limitations on the present invention. Unless otherwise indicated, all parts are parts by weight.

EXAMPLE 1

Amalgamated zinc (6.5% Hg), 35% KOH solution, and hydrolyzed polyacrylonitrile gelling agent (Waterlock A-400) are admixed and formed into a slurry, with the relative ratios being 1228:754:18 (about 0.9% gelling agent). About 4.75 grams of the the slurry mixture are dispensed into each of five alkaline AA size cells as the anode thereof (Cell nos. 1-5). The cells are filled with 1.0 gram of the 35% KOH solution as electrolyte and an $MnO_2$ cathode with the cells being anode limited. The cells are stored for different periods of time and under different temperature conditions and are then discharged with a continuous load of 3.9 ohms with the results being given in the Table below.

EXAMPLE 2
(PRIOR ART)

Five cells (6–10) are made as in Example 1 but with a starch graft copolymer (Water-Lock 221) as the gelling agent present in about 1% by weight. The cells are stored under the same conditions and are then discharged with the same continuous load with the results being given in the Table below.

TABLE

| Cell # | Storage Condition | OCV volts | Hours to 1.0 v | Hours to 0.8 v | Hours to 0.65 v | % Zn Utilization |
|---|---|---|---|---|---|---|
| 1 | Fresh | 1.564 | 3.32 | 5.04 | 5.20 | 62.0 |
| 2 | 130° F., 1 wk | 1.567 | 3.24 | 4.69 | 4.76 | 57.1 |
| 3 | 130° F., 2 wks | 1.564 | 3.21 | 4.59 | 4.65 | 55.8 |
| 4 | 130° F., 4 wks | 1.558 | 2.97 | 4.33 | 4.36 | 52.2 |
| 5 | 160° F., 1 wk | 1.563 | 2.86 | 4.33 | 4.37 | 51.8 |
| 6(PA) | Fresh | 1.562 | 3.46 | 5.01 | 5.15 | 62.0 |
| 7(PA) | 130° F., 1 wk | 1.555 | 3.28 | 4.51 | 4.55 | 55.3 |
| 8(PA) | 130° F., 2 wks | 1.545 | 3.03 | 4.26 | 4.29 | 51.8 |
| 9(PA) | 130° F., 4 wks | 1.539 | 2.94 | 4.11 | 4.13 | 50.0 |
| 10(PA) | 160° F., 1 wk | 1.543 | 2.78 | 4.12 | 4.15 | 49.1 |

In view of the above examples it is evident that the hydrolyzed polyacrylonitrile gelling agent of the present invention provides a significant increase of cell capacity in cells which are discharged after high temperature storage when compared to cells containing starch graft copolymer gelling agents.

The hydrolyzed polyacrylonitrile gelling agent of the present invention provides similar discharge characteristics when compared to the prior art polyacrylic acid gelling agents. However, the hydrolyzed polyacrylonitrile provides several physical advantages which make it more suitable for manufacturing processes. The hydrolyzed polyacrylonitrile is not adhesive in nature and will not detrimentally stick to machinery. Additionally, it does not foam as does the polyacrylic acid and therefore provides a more stable higher density gel.

It is understood that the above examples were presented for illustrative purposes and that changes in cell components and relative ratios of components may be made without departing from the scope of the present invention as defined in the following claims.

What is claimed is:

1. A method of gelling anodes for alkaline cells comprising the step of gelling an anode active material with hydrolyzed polyacrylonitrile and an alkaline electrolyte solution.

2. The method of claim 1 wherein said hydrolyzed polyacrylonitrile is an alkali hydrolyzed polyacrylonitrile.

3. The method of claim 1 wherein said anode active material is comprised of zinc.

4. The method of claim 1 wherein said alkaline electrolyte solution is comprised of a KOH solution.

5. The method of claim 2 wherein said hydrolyzed polyacrylonitrile is comprised of polyacrylonitrile hydrolyzed with KOH.

6. The method of claim 1 wherein the percentage of said hydrolyzed polyacrylonitrile relative to said anode active material and said alkaline electrolyte solution ranges between 0.6 to 1.5% by weight.

7. The method of claim 6 wherein said said percentage ranges between 0.8 and 1.2%.

8. The method of claim 1 wherein said alkaline cells contain cathodes comprised of a member of the group consisting of manganese dioxide, silver oxide, mercury oxide and air.

9. An anode blend for an electrochemical cell comprising an anode active powder and hydrolyzed polyacrylonitrile.

10. The anode blend of claim 9 wherein said hydrolyzed polyacrylonitrile is an alkali hydrolyzed polyacrylonitrile.

11. The anode blend of claim 9 wherein said anode active powder is comprised of zinc.

12. The anode blend of claim 9 wherein said blend further includes an aqueous KOH solution.

13. The anode blend of claim 9 wherein said hydrolyzed polyacrylonitrile comprises between 0.8 to 1.2% by weight of said anode blend.

14. An electrochemical cell comprising a gelled anode, a cathode and an aqueous alkaline electrolyte characterized in that said gelled anode contains hydrolyzed polyacrylonitrile.

15. The cell of claim 14 wherein said hydrolyzed polyacrylonitrile is an alkali hydrolyzed polyacrylonitrile.

16. The cell of claim 14 wherein said anode contains zinc as the anode active material thereof.

17. The cell of claim 16 wherein said aqueous alkaline electrolyte is comprised of a KOH solution.

18. The cell of claim 17 wherein said cathode is comprised of a member of the group consisting of manganese dioxide, silver oxide, mercury oxide and air.

19. The cell of claim 18 wherein said hydrolyzed polyacrylonitrile comprises from 0.8 to 1.2% by weight of said anode.

* * * * *